(12) United States Patent
Pfoertzsch

(10) Patent No.: US 10,351,241 B2
(45) Date of Patent: Jul. 16, 2019

(54) DEVICE AND METHOD FOR AN UNMANNED FLYING OBJECT

(71) Applicant: Antony Pfoertzsch, Bremen (DE)

(72) Inventor: Antony Pfoertzsch, Bremen (DE)

( * ) Notice: Subject to any disclaimer, the term of this patent is extended or adjusted under 35 U.S.C. 154(b) by 0 days.

(21) Appl. No.: 16/004,064

(22) Filed: Jun. 8, 2018

(65) Prior Publication Data

US 2018/0290750 A1 Oct. 11, 2018

Related U.S. Application Data

(63) Continuation of application No. PCT/EP2016/081700, filed on Dec. 19, 2016.

(30) Foreign Application Priority Data

Dec. 18, 2015 (DE) .................. 10 2015 122 183

(51) Int. Cl.
| | |
|---|---|
| B64C 39/02 | (2006.01) |
| B64D 47/08 | (2006.01) |
| G05D 1/10 | (2006.01) |
| G05D 1/12 | (2006.01) |
| G06F 3/01 | (2006.01) |
| G06K 9/00 | (2006.01) |
| G05D 1/00 | (2006.01) |

(52) U.S. Cl.
CPC ............ *B64C 39/024* (2013.01); *B64C 39/02* (2013.01); *B64D 47/08* (2013.01); *G05D 1/0094* (2013.01); *G05D 1/101* (2013.01); *G05D 1/12* (2013.01); *G06F 3/017* (2013.01); *G06K 9/00* (2013.01); *G06K 9/0063* (2013.01); *B64C 2201/024* (2013.01); *B64C 2201/127* (2013.01); *B64C 2201/14* (2013.01)

(58) Field of Classification Search
CPC combination set(s) only.
See application file for complete search history.

(56) References Cited

U.S. PATENT DOCUMENTS

| | | | |
|---|---|---|---|
| 9,164,506 B1 | 10/2015 | Zang | |
| 9,563,201 B1 * | 2/2017 | Tofte | .................. G05D 1/0038 |
| 9,663,227 B1 * | 5/2017 | Lema | .................. B64C 39/024 |

(Continued)

FOREIGN PATENT DOCUMENTS

EP          2 071 353 A2          6/2009

OTHER PUBLICATIONS

Vocativ, https://www.youtube.com/watch?v=uxoneHtAV1Q "This Drone Can Be Controlled With Hand Gestures", Published May 25, 2017.*

(Continued)

*Primary Examiner* — Frederick M Brushaber
(74) *Attorney, Agent, or Firm* — Seed IP Law Group LLP

(57) ABSTRACT

The present disclosure relates to an apparatus and a method for an unmanned flying aircraft, such as a drone. Sensor data of at least one imaging sensor and of at least one ranging sensor are received with a sensor interface and are supplied to a signal processing unit that is set up to compare the sensor data with reference data in order to detect at least one predefined object and/or to distinguish it from other objects and to determine the parameters of the detected or distinguished object. The parameters of the predefined objects are then output with an output interface.

17 Claims, 4 Drawing Sheets

(56) References Cited

U.S. PATENT DOCUMENTS

| | | | | |
|---|---|---|---|---|
| 2013/0289858 A1* | 10/2013 | Mangiat | ............... | G05D 1/0027 |
| | | | | 701/117 |
| 2014/0008496 A1* | 1/2014 | Ye | ........................... | B64C 13/20 |
| | | | | 244/190 |
| 2015/0205301 A1 | 7/2015 | Gilmore et al. | | |
| 2016/0076892 A1* | 3/2016 | Zhou | ..................... | B64C 39/024 |
| | | | | 701/3 |
| 2016/0101856 A1* | 4/2016 | Kohstall | ............... | G05D 1/101 |
| | | | | 244/17.13 |
| 2016/0117853 A1* | 4/2016 | Zhong | .................. | B64C 39/024 |
| | | | | 345/634 |
| 2016/0273921 A1* | 9/2016 | Zhou | ....................... | G01S 19/49 |
| 2016/0349849 A1* | 12/2016 | Kwon | ..................... | G06F 3/011 |
| 2016/0364004 A1* | 12/2016 | Ekandem | ................ | G06F 3/017 |
| 2017/0031369 A1* | 2/2017 | Liu | .......................... | G05D 1/102 |
| 2017/0102699 A1* | 4/2017 | Anderson | ............ | G05D 1/0038 |
| 2017/0180729 A1* | 6/2017 | Wu | ....................... | H04N 19/172 |
| 2017/0225680 A1* | 8/2017 | Huang | ................ | B60R 21/0134 |
| 2017/0371410 A1* | 12/2017 | Boss | ........................ | G06F 3/014 |
| 2018/0061243 A1* | 3/2018 | Shloosh | ............... | G08G 5/0013 |
| 2018/0075596 A1* | 3/2018 | Fryshman | ........... | A01M 21/043 |

OTHER PUBLICATIONS

Ben Popper, DJI's new Mavic Pro drone folds up and fits in the palm of you hand, Sep. 27, 2016, The Verge (Year: 2016).*

* cited by examiner

DEVICE AND METHOD FOR AN UNMANNED FLYING OBJECT

BACKGROUND

Technical Field

The disclosure relates to the field of unmanned flying aircraft, in particular drones, such as copters or multicopters.

Description of the Related Art

Such flying aircrafts are known that have a camera and hence permit shots of items or people from the air, these being transmitted to an operator in parallel, so that the operator can inspect the surroundings. In this regard, the operator controls the flying aircraft to positions from which suitable shots can be recorded.

Further, flying aircrafts are also known that automatically follow objects, such as people or vehicles, and film them, e.g., when a sport is being undertaken, in order to be able to evaluate the film material later, for example. Sportsmen can optimize their movements as a result of the evaluation. In this regard, the flying aircraft tracks the sportsman automatically by virtue of the flying aircraft following a radio transmitter that the sportsman is wearing on his body.

However, further applications are conceivable in which a flying aircraft is automatically supposed to follow an object, such as a person or a vehicle, in order to, for example, assist police reconnaissance of a criminal act. In contrast to the sportsman, this object to be tracked has no radio transmitter on its body, however, which means that the known automatic tracking is not possible.

Range limitations of standard remote controls mean that it is moreover not absolutely possible to track an object to be tracked by manual control.

In particular, the freedom of action of the person controlling the flying aircraft is also severely restricted by the control, which means that parallel active tracking of people by the operator may not be possible while he is controlling the flying aircraft.

BRIEF SUMMARY

It is desirable to solve one of the aforementioned problems in the prior art. The present disclosure is directed to an apparatus and a method that allows the tracking of an object, such as a vehicle or a person, by an unmanned flying aircraft without there being a radio link to a transmitter on the object.

The apparatus is included in the unmanned flying aircraft. The apparatus includes at least one imaging sensor, at least one ranging sensor, a sensor interface, a signal processing unit, and an output interface. Sensor data captured by the imaging sensor and the ranging sensor are received with the sensor interface, and are supplied to the signal processing unit. The signal processing unit compares the sensor data with reference data in order to detect at least one predefined object and/or to distinguish the predefined object from other objects; and to determine the parameters of the detected or distinguished object. The reference data may include prescribed dimensions, values of temperatures, speeds, and/or accelerations of the detected or distinguished object. The parameters of the predefined objects are then output with the output interface for further processing. For example, the parameters may be output to a controller, and the controller may use the parameters to keep the unmanned flying aircraft at a fixed distance from the detected and/or distinguished predefined object.

BRIEF DESCRIPTION OF THE SEVERAL VIEWS OF THE DRAWINGS

Further embodiments will emerge on the basis of the exemplary embodiments explained in more detail in the drawings, in which.

DETAILED DESCRIPTION

Figure 1:
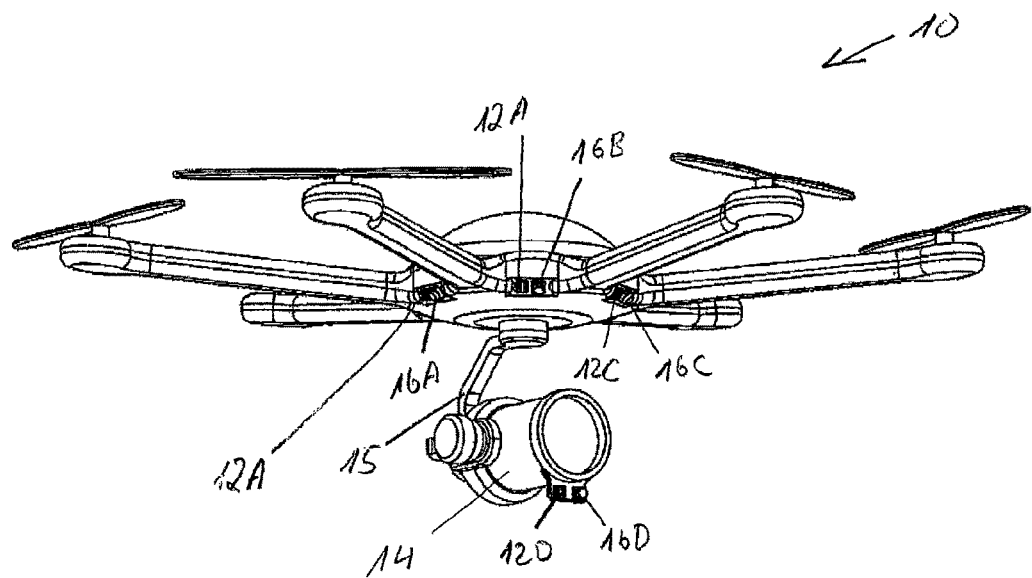
FIG. 1 shows an unmanned flying aircraft.

According to one embodiment, an apparatus for an unmanned flying aircraft, in particular for a drone or a copter, such as a multicopter or a quadrocopter, and a fixed-wing aircraft, is proposed.

The apparatus comprises a sensor interface for receiving sensor data of at least one imaging sensor, and at least one ranging sensor. Further, the apparatus comprises a signal processing unit that is set up to compare reference data with the received sensor data in order to detect at least one predefined object and/or to distinguish a predefined object from other objects. Moreover, the signal processing unit is set up to determine parameters, such as the position, distance and/or movement, of the predefined object. In particular, determination of the parameters relative to the flying aircraft is possible.

The apparatus also comprises an output interface for outputting the position, distance and/or movement of the predefined object.

In one embodiment, the reference data includes prescribed dimensions (e.g., prescribed sizes, widths, and/or depths of an object), prescribed values of temperatures, speeds, and/or accelerations. In one embodiment, the reference data includes ranges of prescribed dimensions (e.g., prescribed sizes, widths, and/or depths), and also ranges of prescribed values of temperatures, speeds, and/or accelerations. The reference data are therefore used to predefine the object to be detected and/or to be distinguished. It is advantageously recognized that object detection on the basis of the sensor data of an imaging sensor and the sensor data of a ranging sensor are considered together in order to detect a predefined object.

Although object detection using an imaging sensor without other types of sensors is possible, using the imaging sensor alone provides two-dimensional shots of surroundings. Therefore, some parameters of an object, such as the object's size, cannot be detected using imaging sensors.

A ranging sensor, such as a radar sensor, can, by contrast, be used to detect parameters of an object, such as the size, the position and the distance, wherein detecting and distinguishing different objects involves very computationally intensive and complex evaluation.

Various embodiments of the present disclosure advantageously allows an object to be distinguished from other objects using the imaging sensor, e.g., on the basis of its contours. In addition, range measurement for the object under consideration by specifically directing the ranging sensor into the area in which the object is located provides a simple way of deriving the distance from the object currently under consideration and then, from that, also the size of the object.

If the parameters of the object, such as the object's size, are concordant with stored reference data, this object can now be distinguished from other objects, or an object consistent with the reference data can be detected.

Objects predefined by the reference data are therefore detectable in a particularly simple manner. Further, the output interface will be used to output the position, distance and/or a movement of the predefined object, these then being able to be used for controlling the unmanned flying aircraft, for example, in order to track the predefined object with a range and/or height prescribed for the control, for example.

Accordingly, it is also possible to describe multiple objects by means of multiple categories in the reference data with each category representing a particular object, and therefore to detect multiple different predefined objects or to distinguish them from other objects. It is also possible for categorization of the predefined objects that have been detected by the signal processing unit to be performed.

According to a first embodiment, the signal processing unit is set up to ascertain or detect movement patterns performed by the object to be detected or the object to be distinguished. If the apparatus is thus used to track the operator himself, so that he can be filmed when undertaking a sport, for example, the operator can control the flying aircraft, for example, by performing a movement pattern that is then detected by the signal processing unit.

For example, it is conceivable for a wave by a person to be detectable by means of image processing of the data recorded with the sensor data of the imaging sensor. This wave is consistent with a previously stored movement pattern, for example, that, in the form of a command, prompts the flying aircraft to terminate the tracking and fly back to an initial place, for example a parking area.

Moreover, it is possible for different ranges between the flying aircraft and the predefined object, which in this case is the sportsman just mentioned, for example, to be set by means of various gestures detected as movement patterns. For example, in one embodiment, if a first gesture performed by the sportsman (e.g., holding up one finger) is detected, a first command may be executed by the flying aircraft to set the distance between the flying aircraft and the sportsman to a first distance. Then, if a second gesture performed by the sportsman (e.g., holding up two fingers) is detected, a second command may be executed by the flying aircraft to change the distance between the flying aircraft and the sportsman to a second distance.

Control of a flying aircraft without remote control is therefore possible.

In one embodiment, movement patterns are used to represent commands to be executed by the flying aircraft, or a value (i.e., parameter) to be used by the flying aircraft that is, for example, infinitely variable. For example, as previously discussed, various movement patterns may be used to set distances between the flying aircraft and a predefined object. In one embodiment, a movement pattern represents a direction vector. For example, different movement patterns may be used to instruct the flying aircraft to fly in different directions.

In one embodiment, the ranging sensors are used to capture three-dimensional gestures of a person as movement patterns. For example, the ranging sensors may be used to detect a person's arm being moved forward, backward, upward, or downward. In one embodiment, the captured three-dimensional gestures are mapped to analog control commands for controlling the unmanned flying aircraft by virtue of the distance between two different body parts of the person performing the gesture (e.g., a distance between the hand and the head of the person) being captured in all three-dimensional lengths. In one embodiment, the captured three-dimensional gestures are used to select a flying aircraft in flight, for example, such as a drone. In one embodiment, a captured three-dimensional gesture is used as a direction vector to point to an object to be tracked.

According to a further embodiment, the apparatus comprises a configuration interface configured to receive reference data, so that these reference data can be used to predefine an object to be detected or to be distinguished. Alternatively or additionally, a memory for storing the reference data is present as part of the apparatus.

Accordingly, reference data are thus prescribable, for example, by means of programming via the configuration interface, by a user of the flying aircraft. The apparatus and hence the flying aircraft are therefore adaptable to detect or distinguish between different objects that are supposed to be tracked, for example. If the flying aircraft is thus supposed, in a first instance of application, to track a person, such as a sportsman on a surfboard while surfing, then different reference data should be used when detecting the person as a predefined object than when tracking a vehicle, such as an automobile.

According to a further alternative, the apparatus preferably comprises a controller, which is, for example, a remote control or a remote radio control. The controller is used to predefine reference data for predefining an object from the memory and/or to assign movement patterns to commands and/or values. To this end, the controller comprises a selection menu that is, for example, displayed on a touch-sensitive screen of the controller.

Therefore, this menu or selection menu is used, on the basis of the capture of arbitrary objects and movement patterns and the existing reaction capability, preferably for use in conjunction with the signal processing unit, in order to stipulate what movement or what physical measured value of arbitrary objects initiates what form of action. By way of example, such a menu can be used to stipulate what type of gestures can be used to control a flying aircraft in what way. In a further case, it is possible, for example, to stipulate that the signal processing unit accepts a gesture control, specifically from any person, as soon as that person points to the drone. Alternatively, it is also possible for the marking of objects, for example, to be stipulated using gestures, and for the actions resulting therefrom to be stipulated, such as the tracking of the marked object.

In one embodiment, new commands can be learned using a learning mode in the signal processing unit. In this case, objects can be placed in front of the sensors and/or numerical inputs can be made within the menu. Subsequently, by way of example, size, speed, and/or thermal ranges of the respective object can be calculated based on measurements captured by the sensors and/or the numerical inputs; and the calculated size, speed, and/or thermal ranges of the respective can be stored as reference data.

In one embodiment, in the case of complex gestures, a start/stop mechanism is used to record the gesture in the manner of a short film, and movements by individual body parts are detected and stored as speed ranges and position data in relation to the body of the person, for example.

According to a further embodiment, detected movement patterns can be used to refer to other objects, for example, in order to initiate the tracking or more precise consideration.

According to a further embodiment, detected movement patterns are used in order to select one or more drones from a plurality of drones and further gestures, which can in turn be detected as movement patterns by the one or more drones, are used to assign, for example, a destination to the one or more drones to travel to or to control the one or more drones by gesture control.

According to further embodiments, measurement conditions and/or movement patterns can be transferred or applied to another object. For example, in one embodiment, pointing by a detected person to another person results in the another person being marked by the flying aircraft and the flying aircraft beginning to track the marked person. In this case, the measurement conditions are adapted to the tracking of the marked person, in order to track the object with a high level of agility and reliability.

According to one embodiment, a command comprises searching for an object within an already captured object. It is thus possible, for example, for the complex capture of a number plate to be coupled to the condition that the number plate should be searched for within a captured object, such as a car, for example. In this case, the computationally intensive image processing of high-resolution data is limited to image areas that contain a car.

Accordingly, according to a further embodiment, the signal processing unit is set up to output sensor settings for setting the sensor, in particular the measurement conditions of the sensor, to the sensor by the sensor interface on the basis of the reference data. Accordingly, the reference data can include measured value capture rules that include, for example, a minimum resolution of a particular object, in which case a minimum resolution is transmitted to the sensor as a measurement condition in the form of a setting for the sensor. Accordingly, according to this embodiment, the reference data comprise rules for measured value capture, which is, for example, a minimum resolution and/or a minimum update rate for one or more sensors. These measured value capture rules can additionally also include a sensor measurement range, for example, which also comprises a precise temperature capture range for an infrared camera, for example.

According to a further embodiment, the sensor interface is used to receive sensor data of at least one imaging sensor that is an infrared sensor for shooting images in the infrared range. Alternatively or additionally, the sensor interface is used to receive sensor data of at least one imaging sensor that is a still and/or video camera for shooting images in the visible light range.

Sensor data of an infrared sensor can therefore also be used for object detection in the darkness at night or under adverse weather influences. The sensor data of the still and/or video camera means that the detection of objects continues to be reliably possible at high ambient temperatures, for example, at which the prevailing ambient temperature is similar to the body temperature of a person to be tracked and it is therefore not possible to use an infrared sensor.

According to a further embodiment, the apparatus comprises at least one imaging sensor that is an infrared sensor for shooting images in the infrared range. In particular, the infrared sensor is an infrared camera and/or a microbolometer. Additionally or alternatively, the apparatus comprises at least one imaging sensor that is a still and/or video camera for shooting images in the visible light range. The apparatus is therefore integrable into an unmanned flying aircraft as a complete component with sensors in a simple manner.

The infrared sensor as an imaging sensor allows recording of temperatures and/or thermal signatures, that is to say an extensive distribution of temperatures, that are characteristic of an object. Therefore, reference data for temperatures or thermal signatures for predefining objects can also be stored in the memory of the apparatus in order to detect objects predefined by the stored temperatures and/or thermal signatures and/or to distinguish them for the other objects with different temperatures and/or thermal signatures.

According to a further embodiment, the sensor interface is set up to receive sensor data of at least one ranging sensor that is a TOF (time-of-flight) camera, or lidar or radar sensor, operating on the basis of the time of flight principle, in particular by means of electromagnetic waves, or a stereoscopic camera. These sensors are known in a small physical size and can therefore use the interface to reliably determine a distance from the object in a suitable manner—at least in the case of a TOF camera, a lidar sensor or a radar sensor—in the darkness at night and/or when visibility is poor.

A radar sensor can simultaneously be used to distinguish between organic and nonorganic objects. If the amplitude of the reflected electromagnetic radar waves is considered, for example, then nonorganic objects, which have a metal surface, reflect the radar waves to a greater extent than a person. By prescribing amplitudes of the radar waves as reference data, it is thus additionally possible to distinguish an organic object from nonorganic objects, or vice versa.

According to one embodiment, the objects are therefore initially determined or identified on the basis of the data of the imaging sensor and then the sensor is used to simultaneously or successively ascertain a distance of each of the determined or identified objects (e.g., a distance between the flying aircraft and each of the determined or identified objects, or a distance between each of the determined or identified objects themselves).

According to a further embodiment, the apparatus comprises at least one ranging sensor that is a radar sensor, a TOF camera, a lidar sensor and/or a stereoscopic camera, e.g., a stereoscopic infrared camera. Accordingly, the apparatus is integrable into an unmanned flying aircraft as an integral component in a simple manner.

According to a further embodiment, the signal processing unit is set up to ascertain and output at least one probability value for the at least one object to be detected and/or to be distinguished, said probability value indicating the reliability of the detection and/or the distinction and/or the parameters, such as the position and/or the distance.

Thus, the signal processing device outputs a probability value, that is to say, for example, a value between 0 and 1, that indicates the probability with which the data output by the output interface are relevant or correct.

A flying aircraft can accordingly assume, when the probability value drops below a predefined threshold value, which may be ascertained by experiments, that the predefined object can no longer be reliably detected and therefore tracking should be terminated.

According to this embodiment, the threshold value is preferably stipulated on the basis of the reference data, and probability values that are at or above the threshold value are consistent with a correct detections and/or distinction and/or parameters and probability values that are below the threshold value are consistent with incorrect detections and/or distinctions and/or parameters.

Moreover, according to this embodiment, preferably the probability value is determined on the basis of the sensor settings For example, the probability value may be set based on the measurement conditions of the sensor, and/or parameters of the predefined object.

The probability value is accordingly adaptive and depends on the context of the captured object. In one embodiment, since, for example, the mere erroneous capture of a human being is less critical than the misinterpretation of a person who currently wishes to control the drone by gesture control, for example, or is supposed to be tracked by the drone, for example, a respective higher probability value is prescribed for both cases than for a passive capture.

Accordingly, the same object can assume different probability values for its capture. In this case, the context should be borne in mind, for example, when the object is supposed to be captured and/or tracked. Additionally, the probability values are adaptive with regard to possible interaction commands, for example the gesture control of the drone. In this case, the probability values change as a result of interaction by the object with the drone.

As a result, the signal processing unit accordingly takes into consideration the compliance with measured value capture rules, for example, minimum resolutions and/or minimum update rates, which are object- and context-dependent.

Further, the present disclosure is directed to a method for an unmanned flying aircraft, in particular for a drone or a copter, such as a multicopter or a quadrocopter, and a fixed-wing aircraft, having an apparatus, in particular according to one of the aforementioned embodiments.

In one embodiment, the method comprises receiving sensor data with at least one imaging sensor and at least one ranging sensor with a sensor interface. Further, the method comprises detecting at least one predefined object and/or distinguishing a predefined object from other objects by comparing reference data with the received sensor data. The objects are thus predefined in particular by the reference data themselves.

Moreover, parameters, such as the position, distance and/or movement, of the predefined object are determined, these being determined in particular relative to the flying aircraft. In one embodiment, the parameters are determined based on the sensor data and/or the reference data. The determination is effected by means of a signal processing unit. Moreover, the method comprises outputting the parameters with an output interface.

According to one embodiment of the method, reference data, in particular parameters, for predefining the at least one object to be detected or to be distinguished are received with a configuration interface and/or stored in a memory.

According to a further embodiment, at least one probability value is output, said probability value being ascertained and output with the signal processing unit for the at least one object to be detected or to be distinguished in order to indicate the reliability of the detection and/or of the distinction and/or of the parameters, such as position and/or the distance, of the predefined object.

According to a further embodiment, movement patterns of the object to be detected or to be distinguished are ascertained with the signal processing unit and are output.

According to a further embodiment, contours of different recorded objects are determined from the sensor data of the imaging sensor with the signal processing unit in the currently captured sensor data and the distances of all the objects (e.g., distances between the flying aircraft and the objects, or a distance between the objects themselves) are captured with the sensor data of the ranging sensor. Further, the sensor data of the imaging sensor and the distance are used to determine the parameters, such as the dimensions, for example, of the objects and to compare them with the reference data. In the event of one or more objects, the parameters thereof, such as dimensions, being concordant with the reference data, these are detected as predefined objects or distinguished from the other objects.

According to a further embodiment, instead of or in addition to the dimensions of the objects, the temperatures and/or thermal signatures of the objects are also determined with the infrared sensor and the dimensions and the temperatures are compared with the reference data. One or more objects are detected as an object or distinguished from the other objects if the dimensions and temperatures are substantially concordant with the dimensions or temperature data stored as reference data.

Finally, the present disclosure is directed to an unmanned flying aircraft having an apparatus according to one of the aforementioned embodiments, which is set up in particular to perform the method according to one of the aforementioned embodiments.

FIG. 1 shows an unmanned flying aircraft 10. In one embodiment, as shown in FIG. 1, the unmanned flying aircraft is a drone, also sometimes called a copter. The unmanned flying aircraft 10 has multiple ranging sensors 12A to 12D, which in this case are consistent with radar sensors. Moreover, a swivelable camera 14 is connected to the flying aircraft. As a result, the camera 14 is able to move or rotate to capture different areas while the unmanned flying aircraft remains stationary.

In one embodiment, the ranging sensors 12A to 12C are immovable, while the sensor 12D connected is firmly connected to the camera 14, which is swivelable relative to the flying aircraft 10. In one embodiment, the camera 14 is connected to the flying aircraft 10 by means of a gimbal 15.

In one embodiment, the unmanned flying aircraft 10 includes imaging sensors 16A to 16D. In one embodiment, the sensors 16A to 16C are immovably connected to the flying aircraft 10, while the imaging sensor 16D is rotatably and swivelably connected to the camera 14. According to this exemplary embodiment, the imaging sensors 16A to 16D are consistent with infrared cameras. The imaging sensors 16A to 16C and the ranging sensors 12A to 12C are also arranged on that side of the flying aircraft 10 that is not visible in the depiction, so that there is a 360-degree view with the sensors 12A to 12C and 16A to 16C at any time. The sensors 12D and 16D are additionally swivelable in order, in particular, to be able to scan a dead angle exactly beneath the flying aircraft and to simplify object tracking.

Figure 2:
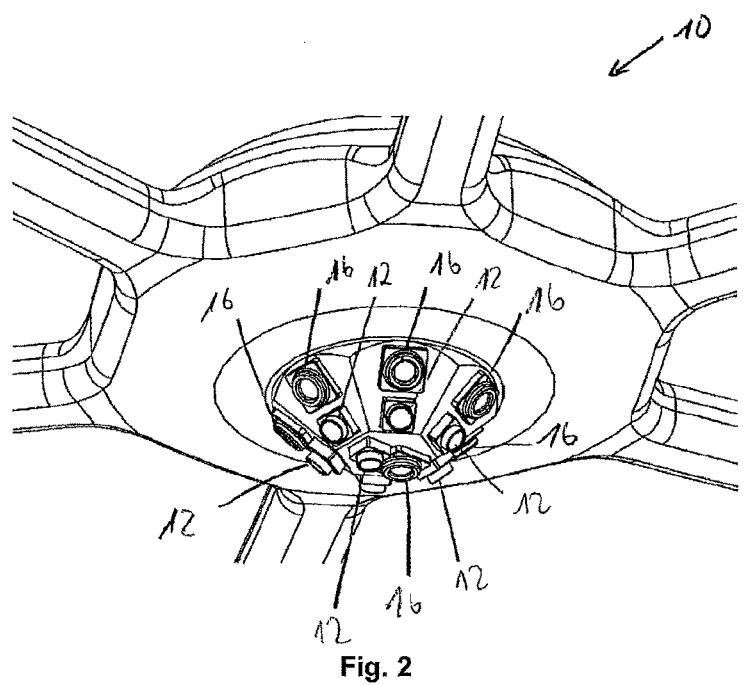
FIG. 2 shows an enlarged depiction of the sensors of an apparatus according to an exemplary embodiment.

FIG. 2 shows an alternative embodiment of the arrangement of the ranging sensors 12 and the imaging sensors 16. In this embodiment, the unmanned flying aircraft 10 does not have to include moving parts since adjacent sensor pairs that each consist of a ranging sensor 12 and an imaging sensor 16 are each arranged at an angle of 60° relative to one another.

Figure 3:
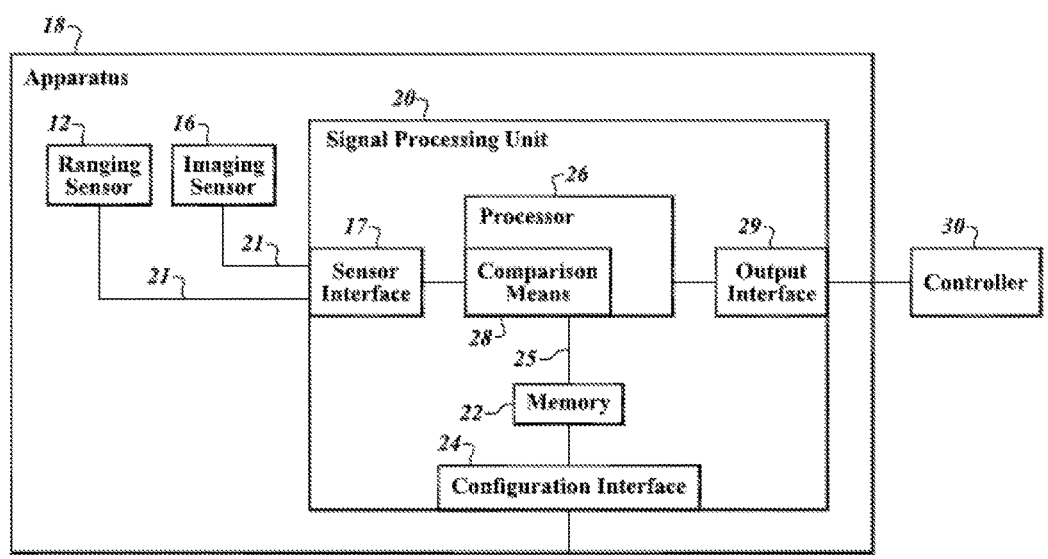
FIG. 3 shows an exemplary embodiment of the disclosure.

FIG. 3 now shows an exemplary embodiment of the apparatus 18, which in this case comprises a ranging sensor 12 and an imaging sensor 16. These sensors are connected to a signal processing unit 20 by means of a sensor interface 17 in order to supply sensor data 21 to the signal processing unit 20. The signal processing unit 20 comprises a memory 22 that stores reference data. These reference data can be programmed and/or reprogrammed via a configuration interface 24. Further, the signal processing unit comprises a processor 26 to which the sensor data 21 of the sensors 12, 16 and the reference data 25 are supplied. According to other exemplary embodiments, not depicted here, a DSP (Digital Signal Processor) or FPGA (Field Programmable Gate Array) is used instead of or in addition to the processor 26.

The processor 26 then takes the sensor data 21 as a basis for detecting dimensions and temperatures of the objects that are in the sensor range of the sensors 12, 16. A comparison means 28 is used to compare the dimensions and temperatures of the objects with the reference data 25 stored in the memory 22, and, in the event of concordance, parameters of the object for which the concordance exists, as well as the dimensions thereof and the position thereof and distance thereof, are transmitted to a controller 30 of the flying aircraft 10 via an output interface 29.

In one embodiment, the controller 30 is then used to keep the flying aircraft 10 at a fixed distance from the detected and/or distinguished predefined object, for example. Accordingly, a movement of the object is trackable. Therefore, people are automatically trackable with a flying aircraft 10 using the apparatus 18 without control of the flight path by a user. Although the controller 30 in FIG. 3 is external to the apparatus 18, the controller 30 may also be included within the apparatus 18.

A problem that exists when using sensors based on controllable electromagnetic waves, such as radar or lidar, is that the speed of light means that one often has to choose in each case between a high resolution and a low update rate, or a low resolution and a high update rate. To overcome this technical problem, in one embodiment, the image area is initially passively captured using a camera, and possible objects for capture within the image area are segmented. Subsequently, the objects are assigned a minimum resolution and a minimum update rate.

As a result, the electromagnetic beam of the sensor is more frequently directed with a high density onto objects of interest and accordingly less often onto objects of lesser interest and their surroundings. The minimum resolution and the minimum update rate are stipulated by the reference data in this case.

In this case, the signal processing unit distinguishes between at least three contexts: the mere capture and depiction of the object, the capture of an object and a resultant tracking of the object, and the capture of an object and a resultant control command or of a signal for use within the signal processing unit. The contexts are extensible as desired and always result from an external or internal signal by virtue of the object or by virtue of a command within the signal processing unit.

Therefore, the measurement conditions for the same object can change frequently during the capture.

Irrespective of the sensor used, the method results in the advantage of details specifically being sought within detected objects. It is thus conceivable to specifically evaluate an image area with a very high resolution, while the remainder of the image is evaluated with a very low resolution or update rate. This will allow details within objects to be highlighted, for example, the face of a human being or else the license plate of a car.

Beside the mere capture of an object, the signal processing unit is designed to track objects and/or to process control commands and signals, for example, by virtue of gestures of a user that are detected as movement patterns. In the example of the cited gesture control, infinitely variable control commands are conceivable that arise from the distance between different body parts, for example. In this case, the sensors capturing the gesture as a movement pattern should have a sufficiently high resolution to capture measured distances from the head to a hand, for example, with sufficient increments between neutral and maximum deflection. Further, the signal processing unit preferably should capture the gestures with a sufficiently high update rate in order to guarantee smooth control.

In one embodiment, if not all minimum conditions (e.g., a minimum resolution) are met when the gesture is captured, capture of the gestures is terminated even though the signal processing unit has detected the gestures as such. It is likewise preferably ensured in this case that the signal processing unit has enough computation power available for particular calculations and captures. In one embodiment, the minimum conditions are dependent on the reference data of the respective object.

Further, the measurement conditions can change as soon as the object performs determined movement patterns or changes its physical state. Likewise, a command, for example, for an object to be tracked by the operator of the drone, can result in an object to be tracked being captured with different measurement conditions.

The context-based adaption of the measurement conditions in accordance with the stored reference data, that is to say predefined objects and selected commands, therefore means that different objects have different measurement conditions. Further, the same object can be assigned new measurement conditions on the basis of a different context (e.g., a command).

Owing to the ability of the signal processing unit to detect, track or interact with objects, it is conceivable that erroneous detections or interpretations of measurement data can lead to critical control errors for the drone. To avoid this problem, in one embodiment, different contexts of the object capture have different threshold values (e.g., a minimum resolution of a detected object) allowing a detection to become admissible. It is thus normally less critical if the signal processing unit erroneously detects a human being than if a human being controls the flying aircraft using gesture control and, during the process, interpretation errors for the gestures arise.

The threshold value is managed adaptively in this case and adapts itself to suit the context in which the object is captured. In one embodiment, if a human being is captured, this is done with a relatively low threshold value. In this case, the measurement data of the sensor system are processed with high tolerance. If the captured human being now wants to control the flying aircraft, then he performs a gesture, for example.

The context of the capture now changes. The threshold value is incremented (e.g., increased the minimum resolution of the detected object) for the detection of control commands and the operator can control the object if the detection of the gestures by the signal processing unit complies with the new, higher threshold value.

This measure guarantees that control commands are captured with a high level of reliability and still the ability of the signal processing unit to continue to assign inaccurate measurement data to an object is maintained.

Owing to the ability of the signal processing unit to detect, track or interact with objects, it is conceivable that the signal processing unit has the reference data and also a configuration that assigns control commands, physical measured values or objects, for example, to an action. It is, for example, possible to stipulate in such a menu what type of gestures can be used to control the flying aircraft and how. Complex commands are also conceivable in this case, for example addressing a flying aircraft by merely pointing at it.

Figure 4:
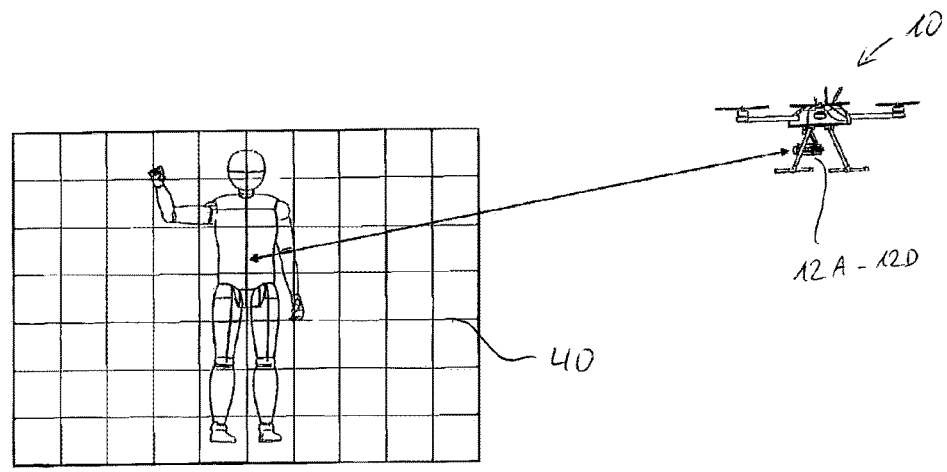
FIGS. 4 and 5 show a capture of movements.
Figure 5:
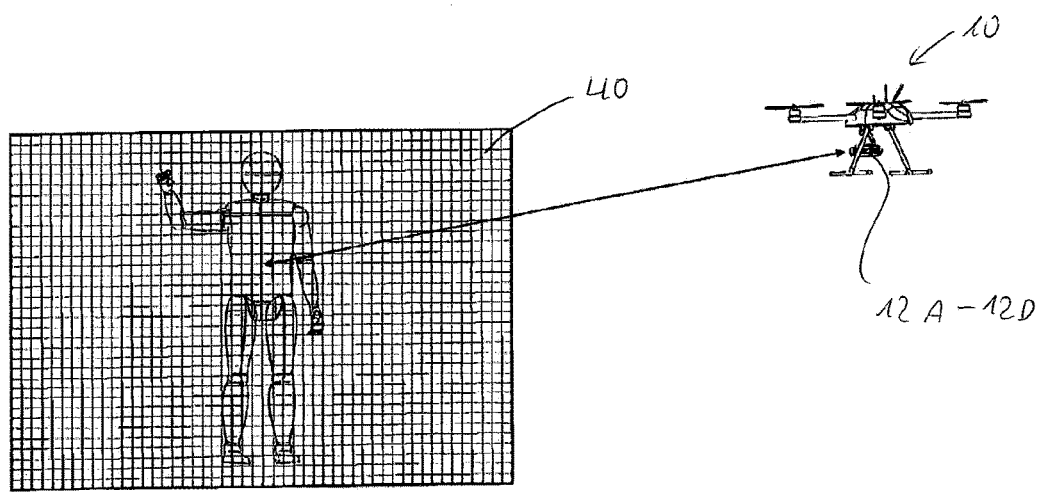

FIGS. 4 and 5 show the capture of gestures by the sensors of the drone. Capture is effected both two-dimensionally and three-dimensionally via the use of at least one video sensor and a depth sensor.

The grid 40 depicted is consistent with the resolution of one of the sensors 12A-12D involved when the operator is captured. In FIG. 4, the distance from the operator is five times greater than in FIG. 5 beneath it.

Although the signal processing unit can detect the human being correctly, it becomes clear that the low resolution in FIG. 4 means that reliable and infinitely variable measurement of the operator is not possible. In FIG. 5, in which the drone is closer to the operator, this is the case, since the resolution is five times higher.

As such, the operator in FIG. 4 would be able to signal three stages from neutral position to maximum deflection by means of the distance from his hand to his head. Since, in addition, some body parts, for example the arms, are much narrower than an image point within the grid, they are also not always captured.

The use of context-based measurement conditions means that the drone, even though it correctly detects the gestures as such, will not process the gestures. For example, since in FIG. 4 the minimum resolution cannot be observed, the drone will not utilize the recognized gesture for subsequent processing (e.g., to control the unmanned flying aircraft 10). In contrast, in FIG. 5, this minimum resolution is observed. As such, in the case of FIG. 5, the drone will utilize the recognized gesture for subsequent processing (e.g., to control the unmanned flying aircraft 10). In one embodiment, the minimum resolution is made up the distance from the object to the unmanned flying aircraft 10, the resolution of the sensor (e.g., imaging sensors 16A to 16D), and the angle of vision captures by the sensor. In one embodiment, the minimum resolution is indicated in pixels/cm for each object within the reference data.

Figure 6:
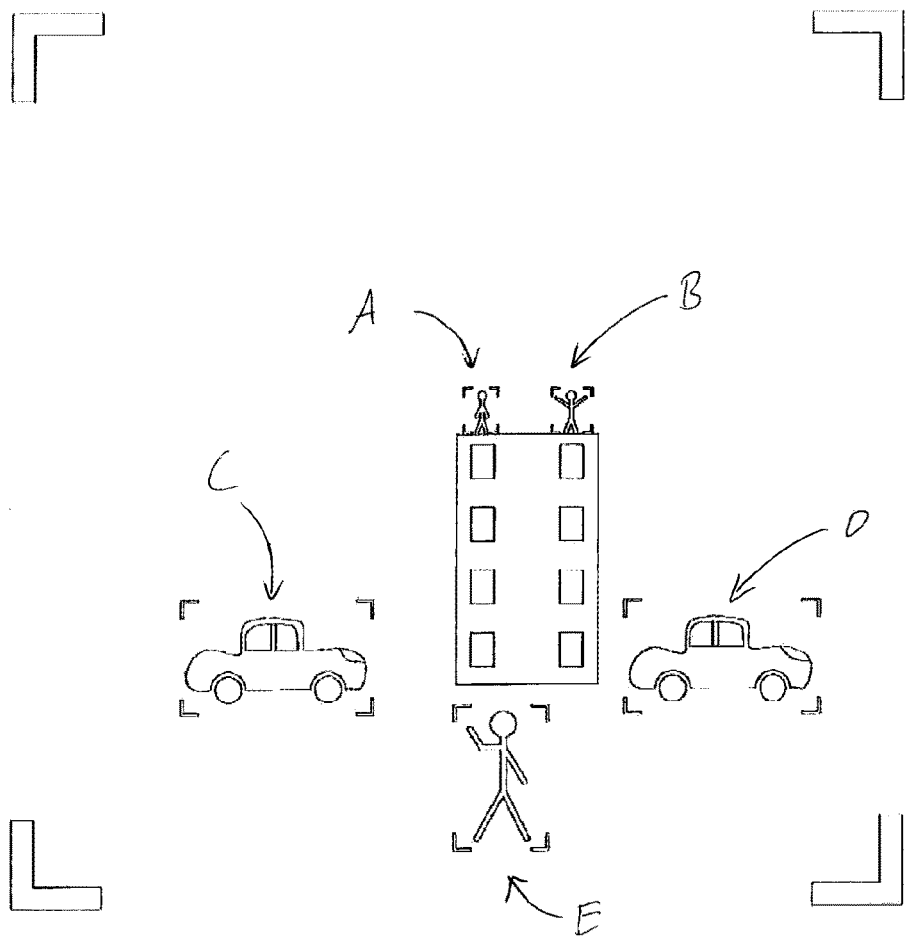
FIG. 6 shows an image area of a sensor of the flying aircraft.

In FIG. 6, the image area of a 1000×1000 pixel solid state lidar can be seen. The sensor can actuate 1 million pixels per second and determine the distance.

Within the image area, there are different objects captured under different contexts. Object A is a human being at rest, object B is a human being performing a gesture. Object C and object D are vehicles that are likewise captured. Object E is a person controlling the drone by gesture control.

The problem in this scenario is that the sensor can update its image area, for example, at 1 Hz. If the sensor is allowed to measure said objects, however, then an update rate of 12.5 Hz is obtained for all objects.

In this scenario, according to the reference data, human beings at rest A are supposed to be captured at 2 Hz and traveling vehicles C, D are supposed to be captured at 5 Hz. However, human beings E exercising active control of the drone are supposed to be captured with at least 20 Hz and human beings B carrying out a signal gesture are supposed to be captured at 15 Hz. On the basis of the speed of light and the number of objects in the image area, a sufficiently high update rate is not possible.

To overcome this problem, a context-dependent measurement method is depicted. The lidar scans the respective objects as often per second as the minimum demands from the reference data. For example, the lidar scans object A at 2 Hz and objects C, D at 5 Hz. This allows measurement processes to be redirected to objects having a higher update rate demands, such as to the operator of the drone (object E), for example. Should objects signal, during the capture, that they are carrying out a gesture, for example, or that the drone is supposed to actively track a captured object, the measurement condition for the respective context is dynamically adapted.

In the image area depicted in FIG. 6, the object A occupies 2137 pixels, the object B occupies 2438 pixels, the objects C and D each occupy 28 600 pixels and the object E occupies 17 712 pixels. Thus, 4346 pixels/sec are obtained for object A, 36 570 pixels/sec are obtained for object B, 143 000 pixels/sec are obtained for each of objects C and D and 354 240 pixels/sec are obtained for object E, so that, using this method, the sensor therefore has to perform 681 156 measurement processes per second and observes the measurement conditions for each object.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An unmanned flying aircraft, comprising:
an imaging sensor on the unmanned flying aircraft;
a ranging sensor on the unmanned flying aircraft;
a sensor interface configured to receive sensor data from the imaging sensor and the ranging sensor;
a memory configured to store reference data for a predefined object;
a signal processing unit configured to detect the predefined object based on a comparison between the reference data and the received sensor data, determine parameters of the predefined object relative to the unmanned flying aircraft, detect a movement pattern performed by the detected predefined object, and control the unmanned flying aircraft by the detected movement pattern; and
an output interface configured to output the parameters of the predefined object.

2. The unmanned flying aircraft of claim 1 wherein the detected movement pattern represents a command to be executed by the unmanned flying aircraft, a variable value to be used by the unmanned flying aircraft, or a direction of flight for the unmanned flying aircraft.

3. The unmanned flying aircraft of claim 2, further comprising:
a remote control configured to assign the movement pattern to the command, the variable value, or the direction of flight.

4. The unmanned flying aircraft of claim 2 wherein the command, the variable value, or the direction of flight represented by the predefined object is applied to another predefined object in response to the movement pattern being detected.

5. The unmanned flying aircraft of claim 1 wherein the signal processing unit is configured to set a resolution of the imaging sensor or a sampling rate of the ranging sensor based on one of the reference data and a performed action of the unmanned flying aircraft.

6. The unmanned flying aircraft of claim 1 wherein the signal processing unit is configured to search for the predefined object within another predefined object that was previously detected.

7. The unmanned flying aircraft of claim 1 wherein the imaging sensor is an infrared sensor for shooting images in an infrared range or a camera for shooting images in a visible light range.

8. The unmanned flying aircraft of claim 1 wherein the ranging sensor is a time-of-flight sensor, a lidar sensor, or a radar sensor.

9. The unmanned flying aircraft of claim 1 wherein the ranging sensor is a radar sensor having an electronically controllable radar beam.

10. The unmanned flying aircraft of claim 1 wherein the signal processing device is configured to determine and output, via the output interface, a probability value for the predefined object, the probability value indicates a reliability of the parameters of the predefined object, the probability value indicates that the parameters are reliable when the probability value is at or above a threshold value, the probability value indicates that the parameters are unreliable when the probability value is below the threshold value, and the threshold value is set based on the reference data.

11. The unmanned flying aircraft of claim 1 wherein the parameters include a position of the predefined object, a distance between the predefined object and the unmanned flying aircraft, or a movement of the predefined object.

12. The unmanned flying aircraft of claim 1 wherein the signal processing unit is configured to distinguish the predefined object from other objects based on the comparison between the reference data and the received sensor data.

13. A method for an unmanned flying aircraft, comprising:

receiving sensor data from an imaging sensor on the unmanned flying aircraft and from a ranging sensor on the unmanned flying aircraft;

comparing reference data for a predefined object to the received sensor data;

detecting the predefined object based on the comparison of the reference data and the received sensor data;

detecting a movement pattern performed by the detected predefined object;

controlling the unmanned flying aircraft by the detected movement pattern;

determining parameters of the predefined object relative to the unmanned flying aircraft; and outputting the parameters of the predefined object.

14. The method of claim 13, further comprising:

receiving the reference data; and storing the reference data in a memory.

15. The method of claim 13, further comprising:

determining a probability value for the predefined object, the probability value indicating a reliability of the parameters.

16. The method of claim 13, further comprising:

executing, by the unmanned flying aircraft, a command based on the detected movement pattern.

17. The method of claim 13 wherein detecting the predefined object includes:

determining contours of the predefined object;

determining a distance between the predefined object and the unmanned flying aircraft;

determining dimensions of the predefined object based on the contours and the distance; and detecting the predefined object based on a comparison between the dimensions of the predefined object and the reference data.

\* \* \* \* \*